United States Patent [19]

Miller et al.

[11] 4,169,679
[45] Oct. 2, 1979

[54] APPARATUS FOR THE EXTRUSION OF CELLULAR THERMOPLASTIC MATERIAL

[75] Inventors: John C. Miller, Piscataway; Archibald L. Burnett, Warren; Leonard S. Scarola, Union, all of N.J.

[73] Assignee: Union Carbide Corporation, New York, N.Y.

[21] Appl. No.: 859,923

[22] Filed: Dec. 12, 1977

Related U.S. Application Data

[63] Continuation of Ser. No. 713,121, Aug. 11, 1976, abandoned, which is a continuation-in-part of Ser. No. 610,240, Sep. 4, 1975, abandoned.

[51] Int. Cl.$^2$ ............... B28C 7/04; B29B 1/06; B29B 5/02
[52] U.S. Cl. ............... 366/76; 366/81; 366/87; 366/169
[58] Field of Search .......... 366/76, 81, 87, 169, 366/319, 324, 83, 88, 89, 90; 425/200, 203, 207, 208, 202, 199, 113, 114; 264/45.9, 46.1

[56] References Cited

U.S. PATENT DOCUMENTS

| 3,344,215 | 9/1967 | De Witzet | 425/4 C X |
| 3,391,051 | 7/1968 | Ehrenfreund | 425/4 C |
| 3,730,492 | 5/1973 | Maddock | 366/76 |

FOREIGN PATENT DOCUMENTS 684976  4/1964 Canada ................... 425/199

Primary Examiner—Robert W. Jenkins
Attorney, Agent, or Firm—Gerald R. O'Brien, Jr.

[57] ABSTRACT

The invention provides apparatus for the production of cellular thermoplastic material comprising an extruder having a hollow barrel, screw means mounted in said barrel to advance material therethrough, mixer head means mounted in said barrel and gaseous blowing agent inlet means positioned in said barrel near the upstream end of said mixer head means, said mixer head means having in the surface thereof a plurality of alternate land and groove means, said land means having close clearance with the internal walls of said barrel near the upstream end thereof in the region of said blowing agent inlet means and alternately spaced and close clearance with said walls in the mixing region downstream of said blowing agent inlet means.

9 Claims, 6 Drawing Figures

APPARATUS FOR THE EXTRUSION OF CELLULAR THERMOPLASTIC MATERIAL

This application is a continuation of our prior U.S. application Ser. No. 713,121, filed Aug. 11, 1976, now abandoned, which is a continuation-in-part of application Ser. No. 610,240, filed Sept. 4, 1975, now abandoned.

The present invention relates to apparatus for the production of cellular thermoplastic material.

Heretofore, many systems have been suggested for the production of cellular thermoplastic material. However, it has been found for a number of applications that the degree of uniformity of blowing agent dispersion in the thermoplastic material is highly critical for successful utilization.

In the production of cellular thermoplastic material in an extrusion process, extrudate variability in uniformity is the direct result of such non-uniform dispersion. The latter is critical in many electrical applications, such as the production of insulation for CATV cable.

Coaxial cables currently employed to transmit television signals (CATV cables) predominantly employ cellular low density polyethylene as the insulating material. Processes for the production of such cellular insulation are presently employed, wherein production is effected by melting solid thermoplastic material in an extruder into which a gaseous blowing agent is injected.

CATV cables must have a very uniform composition and diameter or a portion of the signal may be lost. This type of loss is referred to as structural return loss (SRL). Non-uniformities which cause SRL can be due to variation in the extrusion line, e.g. an eccentric pulley, or in the extrusion process, e.g. extruder surging. Recent runs have shown that gas injection using conventional screws can result in an unstable extrusion. Extruder instability may be measured by fluctuations in head pressure which accurately reflect fluctuations in output or viscosity as shown by the following equation:

$$Pressure = Viscosity \times Constant \times Output$$

Thus, measurement of head pressure may be employed as a measure of extruder stability.

It is, accordingly, the prime object of the present invention to provide apparatus for the production of cellular thermoplastic material having high degrees of structural and compositional uniformity.

Other aims and advantages of the present invention will be apparent from the following description and appended claims.

It is, of course, to be understood that the term "thermoplastic material", as employed herein, is well known to those skilled in the extrusion molding art and includes by way of example such resins as polyethylene, polypropylene, polystyrene, polyvinyl chloride and a wide variety of other synthetic organic resinous materials which are accepted as exhibiting thermoplastic properties, together with thermosetting and elastomeric resinous materials which also exhibit such thermal flowable compositions. In addition, the resins may contain various chemical and/or physical property modifiers or additives such as are well known to the art.

Expanding or blowing gas employed in the apparatus of the invention should preferably (especially for wire and cable applications) be chemically inert toward, and preferably soluble in the base polymer of the expandable composition and would thus include inert gases, such as nitrogen, argon, helium, neon and the like.

Other blowing agents may be used. Thus, such blowing agents would include the fluorocarbon type blowing agents.

While the use of nucleating agents is not required in the broadest aspects of the process of the present invention, it has been found preferable to employ nucleating agents.

The nucleating agents which may be used in the compositions of the present invention are materials which provide fine particle size nucleating sites in the thermoplastic material base polymer during the expansion or blowing thereof, as described below.

The particle size of the nucleating agents should be of the order of about 0.01 to 50 microns. Such materials would include polytetrafluoroethylene, azodicarbonamide p,p'-oxybis(benzene sulfonyl hydrazide), trihydrazino-sym-triazine, and p-toluene sulfonyl semicarbazide.

The nucleating agents may be used individually or in combination thereof.

The nucleating agents should be dispersed as uniformly as possible throughout the mass of the base polymer.

In accordance with the invention, apparatus is provided for the production of cellular thermoplastic material comprising an extruder having a hollow barrel, screw means mounted in said barrel to advance material therethrough, mixer head means mounted in said barrel and gaseous blowing agent inlet means positioned in said barrel near the upstream end of said mixer head means, said mixer head means having in the surface thereof a plurality of alternate land and groove means, said land means having close clearance with the internal wall or walls of said barrel near the upstream end thereof in the region of said blowing agent inlet means and alternately spaced and close clearance with said walls in the mixing region downstream of said blowing agent inlet means.

Figure 1:
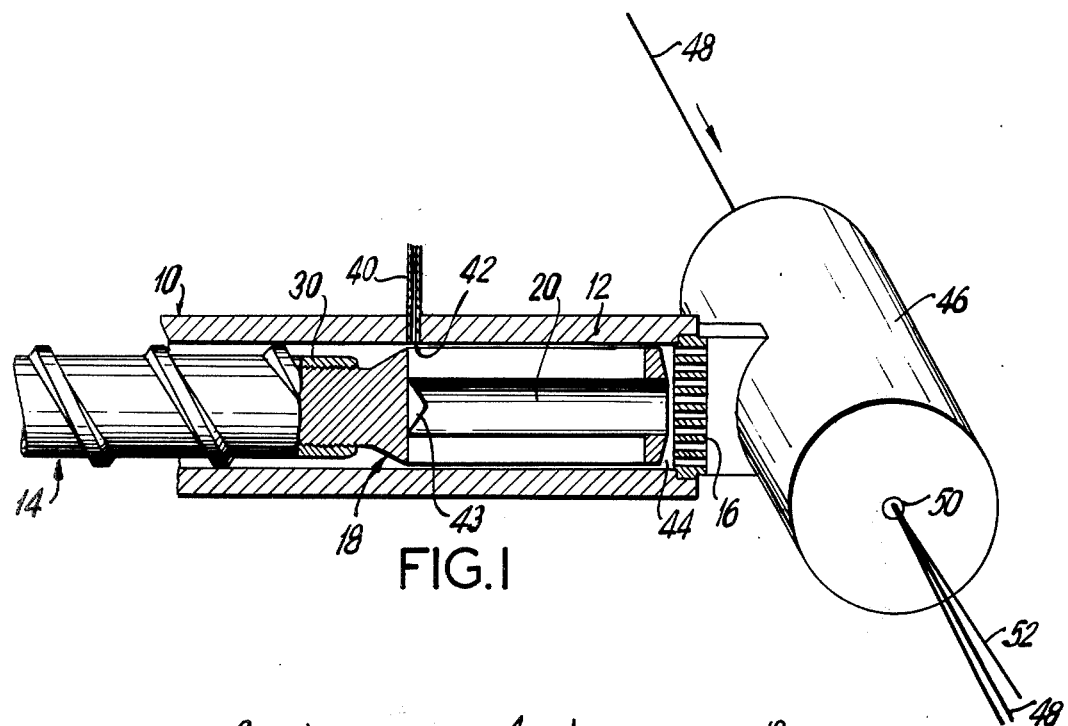
FIG. 1 is a cross-sectional view of extruder and wire drawing apparatus embodying the invention.
Figure 2:
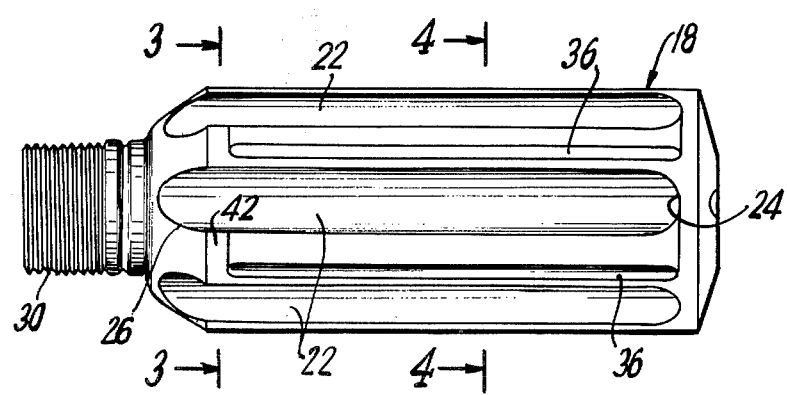
FIG. 2 is an elevational view of mixer head means employed in the embodiment of FIG. 1.

Referring specifically to the embodiment of FIGS. 1 and 2 of the drawings, extruder 10 is provided having outer housing 12, screw means 14 and breaker plate 16. Cylindrical mixer head means 18 is positioned on the terminal (downstream) end of screw means 14 and comprises an internal axial passage 20 and a plurality of external longitudinal groove means 22 open on the upstream ends 26 and closed on the downstream ends 24.

Mixer head means 18 is secured to screw means 14 as by screw threads 30.

As thermoplastic material is fed to extruder 10 it passes through the screw section where screw 14 is designed to flux and melt the material before passage to the mixer head means 18. The molten material is divided into a plurality of parallel flow streams which pass into the plurality of longitudinal groove means 22 formed between longitudinal land pairs 32 and 34.

Figure 3:
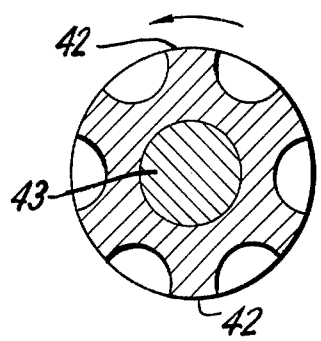
FIG. 3 is a sectional view taken along the line 3—3 of FIG. 2.

Gaseous blowing agent is introduced into the extruder 10 through inlet 40 which is positioned to inject the gas into the groove means 22 of the mixer head 18 near the upstream ends thereof. As shown in FIG. 3, the mixer head lands in this region 42 are in close clearance with the inner walls of the extruder barrel. The rotation of the screw means 14 including the mixer head 18 causes the lands to constantly sweep the gaseous blowing agent inlet port and intermittently open and close passage of gas under substantially full inlet pressure to the parallel molten material streams passing through the plurality of groove means 22.

Figure 4:
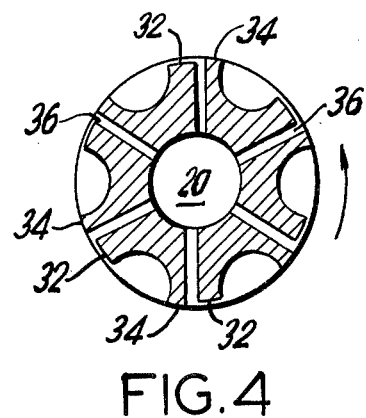
FIG. 4 is a sectional view taken along the line 4—4 of FIG. 2.

The lands downstream of the region 42 comprise land pairs 32 and 34 of different heights, as shown in FIG. 4. As there shown, the leading edge 32 of land pairs are in spaced clearance with the walls of the extruder barrel to provide therebetween regions of high shear mixing as the material and gas pass from the plurality of grooves 20 over these edges to radial conduits 36 to the internal axial passage 20. The parallel streams of mixed gas and molten thermoplastic material are there joined in passage 20 and pass as a confluent stream from the mixer head 18 to discharge chamber 44 upstream of breaker plate 16. Conical member 43 is positioned at the upstream end of passage 20 to reduce the degradation of material in that region.

The gas and molten material in the plurality of grooves 22 are there mixed by a circular, swirling action caused by rotation and passage along the internal walls of the extruder housing. This action also prevents clogging of material in the mixing grooves.

The close clearance of the trailing portion of the land pairs 34 causes a cleaning action along the internal walls of the extruder barrel.

The molten material discharging through the breaker plate 16 of extruder 10 passes through chamber 44 to die head 46. An electrical conductor 48, which is to be coated with cellular thermoplastic material is fed to the die head at speeds of from about 20 to 10,000 feet per minute. A uniform coating of molten extrudate is continuously applied to the conductor as it passes through the die head. The initial thickness of the coating is determined by the orifice in die 50 which is located in the side of die head 46, and through which the coated conductor emerges from the die head. The coating thereon begins to expand because of pressure and temperature and is cone shaped for a short distance from the die, but then will stabilize at its maximum expanded thickness to yield the uniformly thick cellular thermoplastic material coating around the electrical conductor.

Figure 5:
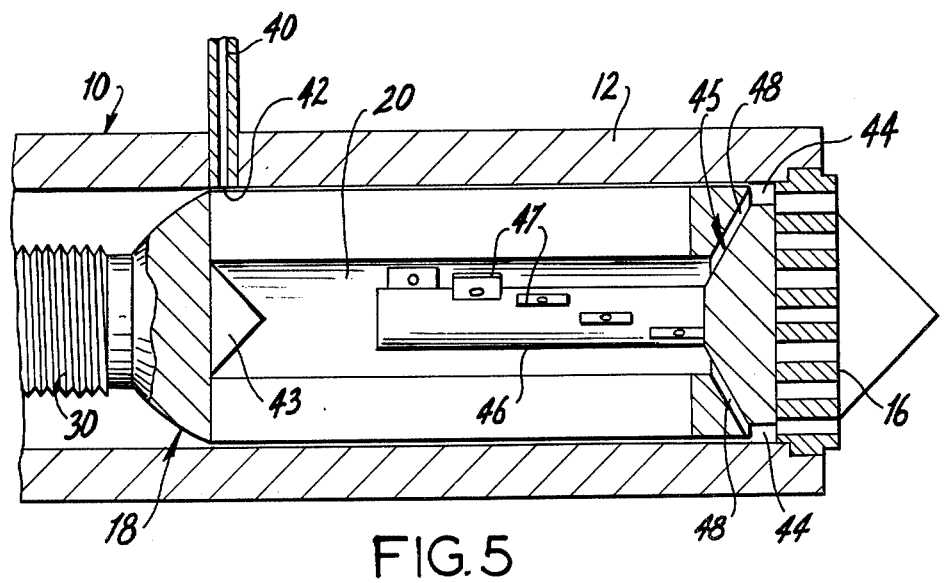
FIG. 5 is a cross-sectional view of a modified extruder embodying the invention.

As shown in the modified embodiment of FIG. 5 of the drawings, an extruder 10 is provided having positioned in the hollow internal passage 20 of mixer head 18 means 45 for the disruption of flow channeling of the thermoplastic material-gaseous blowing agent mixture within passage 20. Such means 45 are secured to breaker plate 16 and extend back toward the upstream end of hollow internal passage 20 to provide a stationary agitator assembly 46 having agitating fins 47 positioned around the periphery thereof. These fins 47 are arranged in a helical pattern, as shown in the embodiment of FIG. 5. The effect of means 45 and 46 with appended fins 47 is to cause the thermoplastic material-gaseous blowing agent mixture passing through hollow internal passage means 20 to be constantly subjected to a mixing action which disrupts the flow channeling of this mixture within the hollow passage 20. The stream is then passed through an outwardly flaring passage 48 to an annular manifolding region 44 from which it is passed through the passages of breaker plate 16 which are aligned in a ring around the outer periphery of the breaker plate.

Figure 6:
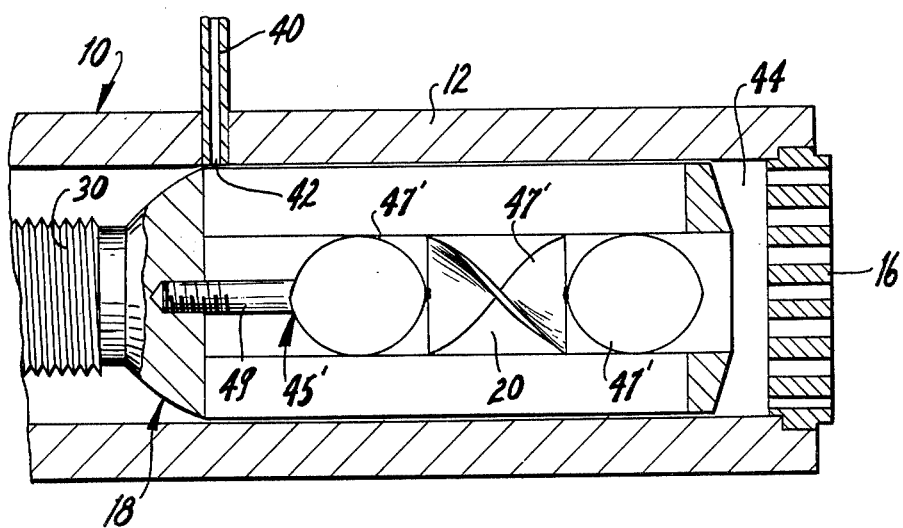
FIG. 6 is a cross-sectional view of another modified extruder embodying the invention.

Another modification of apparatus suitable for employment in the practice of the invention is shown in FIG. 6 of the drawings wherein a modified means 45' for the disruption of flow channeling is employed comprising a series of ribbon-shaped spiral sections 47' which are axially mounted at right angles to each other along the ring of the hollow internal passage 20 of the mixer head 18 and are secured to the mixer head by rod member 49 at the upstream end thereof. In this modified embodiment, agitating action of the ribbon shaped means 45' acts to disrupt the flow channeling of the mixture of thermoplastic material and gaseous blowing agent passing through the hollow internal passage 20 and, in turn, through manifold passage 44 and breaker plate 16.

Employing a 2½", 24/1-L/D ratio extruder, various screw designs were evaluated with gas injection. Extruder stability was measured by head pressure fluctuations, which were recorded on a strip chart. With some designs, the screw was pushed out after the polymer was solidified, revealing the flow and dispersion of the gas. The results are summarized in the following table.

In all runs the basic screw used was a conventional polyethylene extruder screw having the following design:

| Feed Section | 3 turns | 0.450" depth |
|---|---|---|
| Transition Section | 13 turns | |
| Metering Section | 4 turns | 0.095" depth |
| Pitch = Diameter (2.5") | | |

The downstream end of the screw was threaded so that various designs could be added making a total L/D ratio of about 23/1. The extruder barrel was drilled to permit gas injection at many locations.

In Run 1, the added end design was a mixing section preceded by a ring. The mixing section had a standard LeRoy type (U.S. Pat. No. 3,486,192) fluted (grooved) design with three inflow flutes and three outflow flutes. This section provided mixing and shearing of the gas-polymer mixture. The ring provided an annular space or unflighted section into which the gas could be injected. It was thought that the absence of a flight would prevent the gas flow from being cut off momentarily, and provide a more stable extrusion. The resulting short term pressure fluctuations were good, but a portion of the gas tended to collect in the annulus section until saturation level was reached, then it would rapidly discharge from the section and exit the extruder, in some cases completely undispersed. This was continuously repeated on a 5 to 10 minute cycle, and the foam density varied greatly.

In Run 2, the screw end was a section with 12 longitudinal flutes. For purposes of differentiation, this is called a fluted non-mixing section. In this Run, it served only to convey the resin from the end of the screw to the extruder head. The gas was injected four turns upstream of the flutes and represented injection into a flighted section of a conventional screw. The buildup-discharge cycle of Run 1 was not observed, apparently due to the flight breaking up the gas once per revolution. However, the stability was not good, and observation of a screw pushout revealed that some of the gas tended to collect and flow along the low pressure side (trailing edge) of the screw flight. This resulted in poor mixing and accounted for the head pressure variation.

Run 3 employed the same screw as Run 2, but the gas was injected at the upstream end of the fluted-non-mixing section. This resulted in better stability than Run 2 even though there was much less extruder residence time for the gas/polymer mixture. This showed the importance of breaking the gas into small discrete volumes.

In Run 4, the fluted non-mixing section was replaced by the fluted mixing section described in Run 1. This provided better stability than the fluted non-mixing section despite the fewer number of flutes. This is attributed to the mixing and shearing provided by this LeRoy type fluted section.

In Run 5, an internal fluted mixing section having six flutes of the embodiment shown in FIGS. 1 and 2 of the drawings was used. Gas was injected at the upstream end of the flutes. The gas/polymer mixture flowed down the flutes, over a high shear barrier, through a slot into the center of the section, and exited from the center. This design provided excellent stability. It performed better than the mixing section of Run 4 because it had more in-flow flutes and thus could break the gas into smaller volumes, and additionally because it provided added residence time while the resin slowly flowed through the center of the section.

Run 6 employed the same screw and mixer head section as Run 5, but gas was not injected. This is a control to illustrate that gas injection does reduce extrusion stability.

In these runs, the blowing agent employed was nitrogen gas, the extruder had a screw speed of 80 RPM and an output rate of 80 Lbs/Hr. The resin was polyethylene having a density of 0.920 g/cc and a melt index of 0.1 dg/min.

TABLE

| Run | Location of Injection Port | Foam Density g/cc | Extrusion Stability (Head Pressure Fluctuations) psi |
|---|---|---|---|
| 1 | Annulus (unflighted section) | varied | ± 1.0 |
| 2 | Four turns upstream of fluted section (injection into flighted section) | 0.45 | + 3.0 |
| 3 | Upstream end of fluted section | 0.45 | ± 2.0 |
| 4 | Upstream end of fluted mixing section | 0.50 | ± 1.5 |
| 5 | Upstream end of fluted mixing section | 0.42 | ± 0.5 |
| 6 | No gas injected | 0.92 | ± 0.25 |

What is claimed is:

1. An extruder having a hollow barrel, screw means mounted in said barrel to advance material therethrough, mixer head means mounted in said barrel and gaseous blowing agent inlet means positioned in said barrel near the upstream end of said mixer head means, said mixer head means having in the surface thereof a plurality of alternate land means and groove means, said land means having close clearance with the internal walls of said barrel at the point of positioning of said blowing agent inlet means so that said blowing agent inlet means is intermittently opened and closed by said land means to the passage of blowing agent to said plurality of groove means, and land pairs alternately in spaced clearance and close clearance with said walls in the mixing region downstream of said blowing agent inlet means.

2. An extruder in accordance with claim 1 wherein said mixer head means has hollow internal passage means positioned therein over a substantial portion of its terminal length, and a plurality of inlet conduits severally communicating between said land pairs of said plurality of land means and said hollow internal passage means.

3. An extruder in accordance with claim 2 wherein means for disruption of flow channeling are positioned in said hollow internal passage of said mixer head means.

4. An extruder in accordance with claim 3, wherein said means for disruption of flow channeling is mounted so as to be stationary with respect to said extruder barrel.

5. An extruder in accordance with claim 3, wherein said means for disruption of flow channeling is mounted so as to corotate with said rotating mixer head means.

6. An extruder having a hollow barrel, screw means mounted in said barrel to advance material therethrough, mixer head means longitudinally mounted in said barrel near the terminal end of said screw means and gaseous blowing agent inlet means positioned in said barrel near the upstream end of said mixer head means, said mixer head means having in the surface thereof a plurality of alternate land and groove means arranged to extend substantially longitudinally defining a plurality of grooves open at the upstream ends and closed at the downstream ends, said land means having close clearance with the internal walls of said barrel at the point of positioning of said blowing agent inlet means, so that said blowing agent inlet means is intermittently opened and closed by said land means to the passage of blowing agent to said plurality of groove means, and land pairs alternately in spaced clearance and close clearance with said walls in the mixing region downstream of said inlet means, said mixer head means having hollow internal passage means positioned therein over a substantial portion of its terminal length, and a plurality of inlet conduits severally communicating between said plurality of land means and said hollow internal passage means, said inlet conduits being positioned between said plurality of alternate spaced clearance and close clearance land pairs of said land means which are, in turn, positioned between said grooves.

7. An extruder in accordance with claim 6, wherein means for disruption of flow channeling are positioned in said hollow internal passage of said mixer head means.

8. An extruder in accordance with claim 6, wherein said means for disruption of flow channeling is mounted so as to be stationary with respect to said extruder barrel.

9. An extruder in accordance with claim 6, wherein said means for disruption of flow channeling is mounted so as to corotate with said rotating mixer head means.

* * * * *

UNITED STATES PATENT AND TRADEMARK OFFICE
CERTIFICATE OF CORRECTION

PATENT NO. : 4,169,679
DATED : October 2, 1979
INVENTOR(S) : Miller et al

It is certified that error appears in the above-identified patent and that said Letters Patent are hereby corrected as shown below:

In col. 5, in the Table, Run 2 " +3.0" should read -- $\pm 3.0$ --.

In claim 8, line 1, "with claim 6" should read -- with claim 7 --.

In claim 9, line 1, "with claim 6" should read -- with claim 7 --.

Signed and Sealed this

Twenty-fifth Day of November 1980

[SEAL]

Attest:

SIDNEY A. DIAMOND

Attesting Officer

Commissioner of Patents and Trademarks